United States Patent [19]

Richards et al.

[11] Patent Number: 5,372,071
[45] Date of Patent: Dec. 13, 1994

[54] THRUSTING SEPARATION SYSTEM

[75] Inventors: Les H. Richards, Temple; J. Ken Vinson; David J. Schorr, both of Austin, all of Tex.

[73] Assignee: Tracor, Inc., Austin, Tex.

[21] Appl. No.: 90,761

[22] Filed: Jul. 13, 1993

[51] Int. Cl.$^5$ .......................... F42B 15/38; F42B 1/00
[52] U.S. Cl. ........................................ 102/378; 89/1.14
[58] Field of Search .................... 89/1.14; 102/378; 60/632

[56] References Cited

U.S. PATENT DOCUMENTS

| | | | |
|---|---|---|---|
| 3,106,131 | 10/1963 | Barr | 89/1.14 |
| 3,119,302 | 1/1964 | Barr | 89/1.14 |
| 3,139,031 | 6/1964 | Schroter et al. | 102/378 |
| 3,185,090 | 5/1965 | Weber | 89/1.14 |
| 3,311,056 | 3/1967 | Noddin | 102/275.1 |
| 3,319,520 | 5/1967 | Stefano et al. | 89/1.14 |
| 3,362,290 | 1/1968 | Carr | 89/1.14 |
| 3,373,686 | 3/1968 | Blain et al. | 89/1.14 |
| 3,404,598 | 10/1968 | Angelos | 89/1.14 |
| 3,486,410 | 12/1969 | Drexelius et al. | 89/1.14 |
| 3,501,112 | 3/1970 | Webb | 244/1 |
| 3,633,456 | 7/1969 | Carr | 89/1.14 |
| 3,698,281 | 10/1972 | Brandt et al. | 89/1.14 |
| 4,106,875 | 8/1978 | Jewett | 403/2 |
| 4,648,227 | 3/1987 | Reusch | 102/378 |
| 4,685,376 | 8/1987 | Noel et al. | 89/1.14 |
| 4,867,357 | 9/1989 | Inglis et al. | 244/121 |
| 4,879,941 | 11/1989 | Repe et al. | 89/1.14 |
| 5,109,749 | 5/1992 | Olcer | 89/1.14 |
| 5,129,306 | 7/1992 | Fauvel | 89/1.14 |

OTHER PUBLICATIONS

Marketing Brochure, Orbital Sciences Corporation, 1992, 12500 Fair Lakes Circle, Fairfax, Va. 22033.
Marketing Brochure, Orbital Sciences Corporation, 1991, 12500 Fair Lakes Circle, Fairfax, Va. 22033.
Bemment and Schimmel, Investigation of Super Zip Separation Joint, NASA Technical Memorandum 4031, 1988, NASA Scientific and Technical Information Division.
X-SMDC, Expanding Tube Design Summary, ET, Inc., a subsidiary of OEA, Inc., Jul. 1990.

*Primary Examiner*—David Brown
*Attorney, Agent, or Firm*—Arnold, White & Durkee

[57] ABSTRACT

A separating joint for use primarily in aerospace applications is provided having two operational components. The first component provides a very high force over a short stroke distance, using an explosively actuated expanding-tube, suitable for shearing connectors such as rivets. The second component provides a longer stroke, thrusting force to impart a separating velocity to the structures connected using this joint. The second component comprises a flexible bellows surrounding the expanding-tube. The bellows is inflated by gases that exit the expanding-tube, usually through vent holes in the tube wall. In operation, the detonation of an explosive cord in the tube causes the tube to expand and shear rivets or other connectors. The detonation gases then exit the tube to inflate the bellows, which further pushes the separated structures apart. This invention thus provides a high strength separable joint having relatively low weight and capable of providing a high thrusting force. This invention thus provides a high shear force capable separation joint which produces high separation thrusting, forces and is of relatively low weight.

17 Claims, 8 Drawing Sheets

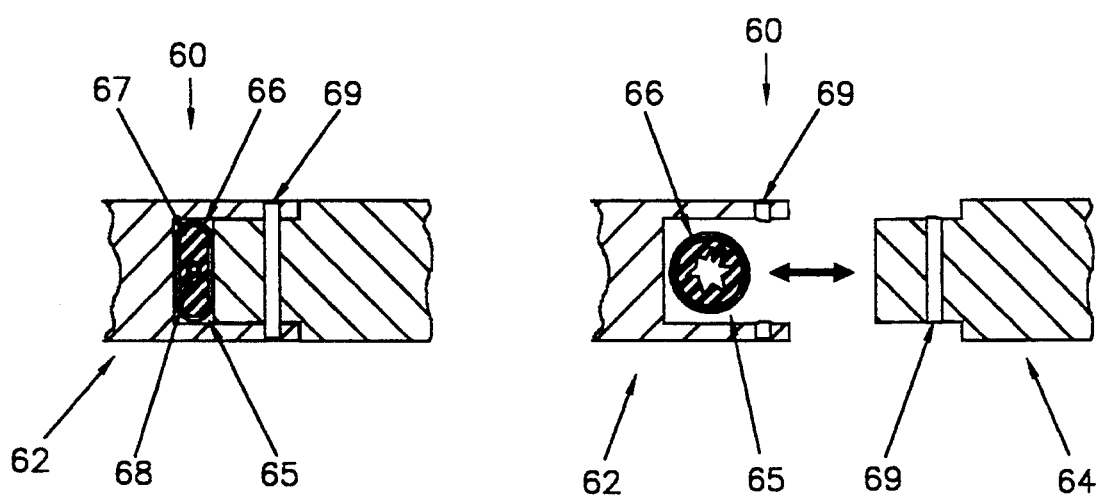
FIGURE 8 — Prior Art

THRUSTING SEPARATION SYSTEM

BACKGROUND OF THE INVENTION

A. Field of the Invention

The present invention relates to a noncontaminating thrusting separation system and more particularly in preferred embodiments to the longitudinal separation joint portion of an explosively operated linear separation system that may be used for separating payload fairing protective structures from launch vehicles during the flight of a rocket, missile or other vehicle.

B. Background of the Related Art

Linear explosive separation systems have found many uses in space launch vehicle applications as shown in FIG. 7. For example, such systems are used in longitudinal fairing split-line joints 50, to allow the jettison of fairing structures 51 to uncover the protected spacecraft payload 52. Explosive separation systems are also used in circumferential fairing base joints 54 and interstage joints 56. Typical linear separation systems in use include the thrusting joint, the expanding-tube (X-Tube) double fracture joint, the expanding-tube rivet shear joint and the flexible linear shaped charge (FLSC) or mild detonating cord (MDC) severance joint.

One prior art thrusting joint separation system, as taught in U.S. Pat. No. 3,362,290 to Carr et al., is typically used in payload fairing split-line separation applications having moderate to low longitudinal structural joint shear requirements. This thrusting joint uses the controlled flow of hot gases generated by the detonation of MDC to inflate a flexible bellows. The action of the expanding gases in the inflatable bellows creates a force used to shear joint retaining rivets and provide thrusting energy to jettison the fairing shell structures. The system is noncontaminating, in that the products of detonation do not leave the bellows, and eliminates the need for additional separation thrust mechanisms. However, the joint is heavy and has poor load carrying capability prior to separation. The poor load carrying capability is a direct result of the limited shear force that the pressurized bellows can generate. This limited shear force requires that a limited number of relatively weak rivets be used to join the fairing shell structures prior to separation.

Expanding-tube double fracture separation systems are typically used in large diameter, highly loaded circumferential interstage or payload fairing base separation applications. These double fracture type joints are also used in payload fairing longitudinal split-line separation applications requiring high shear release forces. The double fracture joints are lightweight with high load carrying capability. However, as the tube expansion is predominately in the plane of separation, a non-thrusting separation is achieved. Thrust, if required, must be obtained through the incorporation of spring actuators or other thrusting mechanisms. Two expanding-tube double-fracture type joints are described in U.S. Pat. No. 3,698,281 by Brandt et al. and U.S. Pat. No. 4,685,376 by Noel et al.

Expanding-tube rivet shear type separation joints can be used in highly loaded circumferential or longitudinal joints where separation velocity requirements are minimal or the mass to be jettisoned is relatively small. An exemplary prior art expanding-tube joint 60 is presented in FIG. 8. The high force, short stroke expanding-tube device is well suited for shearing retention rivets. As the tube expansion is in the direction of the separating joint halves, a small thrust is produced.

FLSC and MDC severance type joints have been used for the linear separation applications shown in FIG. 7, for example, but they are contaminating. That is, the debris and other products of the detonated explosive are dispersed into the environment, where they may interfere with the operation of the payload or the launch vehicle, especially where delicate instruments are involved. The joints are lightweight and capable of carrying high structural loads, but the shock and debris generated by the unshielded cord at the separation event make them unattractive for many launch vehicle applications. A typical FLSC-type interstage separation joint is taught by U.S. Pat. No. 3,185,090 to Weber and a typical MDC-type missile stage separator joint is taught by U.S. Pat. No. 3,139,031 to Schroter et al.

To provide additional background information on the present invention, a brief historical discussion is presented on mild detonating cords, expanding-tube sheathed mild detonating cords, thin walled steel expanding-tubes and inflatable bellows thrusting joint systems. Rivet shear capabilities and joint weights of several thrusting joints are compared and a summary is presented.

Linear explosive cords were originally developed to transfer an explosive stimulus from one point to another. Such products are often employed in blasting. For the last 30 years, detonating cords have found space-age applications, e.g., in missile stage and fairing systems. The linear explosive used in these systems is typically a mild detonating cord (MDC). The explosives used in the core of these systems and the present invention can be any of the wide variety of explosives. Examples of such explosives are taught by U.S. Pat. No. 3,311,056 to G. A. Noddin. Chief among these are PETN, RDX, HMX, HNDS, DIPAM, and HNS as presented in Table 1. The explosive core of the MDC is typically contained within a suitable cover material. For example, PETN is typically contained in a waterproof textile cover; whereas, the other explosive cores are typically contained in a drawn, soft metal exterior cover, such as lead, aluminum or silver. Upon detonation of the explosive core this outer cover fragments, thereby contaminating the immediate vicinity with the by-products of the explosion and the cover material. For explosive core loads of useful interest to the present invention (5 to 25 grains per foot), these MDCs (core plus cover) range from 0.090 to 0.120 inches in diameter. The detonation propagation velocity for these MDCs ranges from 8,300 meters per second for PETN to 6,800 meters per second for HNS. These high velocities are advantageous in that they result in near simultaneous operation of all portions of a linear joint system.

TABLE 1

| Typical Mild Detonating Cord Explosive Compounds | |
|---|---|
| PETN | pentaerythritol tetranitrate |
| RDX | cyclotrimethylenetrinitramine |
| HMX | cyclotetramethylenetetranitramine |
| HND | hexanitrodiphenylsulfone |
| DIPAM | dipicramid |
| HNS | hexanitrostilbene |

Environmental requirements for noncontaminating and low shock producing linear separation systems have led to developments, such as the non-rupturing detonating cord taught in U.S. Pat. No. 3,311,056 to G. A. Noddin and the similar expanding tube technology taught in U.S. Pat. No. 3,373,686 to Blain et al. These inventions use the radial expansion of a sheathed MDC to perform a structural severance or separation function without contamination of the adjoining area. Both of these inventions have a radially expanding tube assembly consisting of an elastomer outer tube, and MDC, which is coaxially located within the sheath. The sheath is designed to position and protect the MDC, enhance the transmission of the detonation shock and pressure energy, and, in some applications, contain the products of detonation. As taught in the Blain '686 patent, the sheath used in the expanding-tube device is typically constructed of an elastomeric material having sufficient radial elasticity to perform useful work against an adjoining body, and further having sufficient tensile strength to prevent rupturing of the sheath material when radially expanded by the generated force of detonation of the explosive core. Detonation of the MDC produces a shock wave and an associated pressure increase which causes an immediate uniform radial expansion of the tube. The force generated by the radial expansion of the tube is sufficient to do work such as to sever an adjoining structure or to shear rivets.

Tube assemblies formed of two or more differing materials—for example, a thin walled stainless steel tube housing an inner elastomer sheath—were also taught by the Blain '686 patent. Another example of a thin walled expanding-tube structure was taught in U.S. Pat. No. 3,486,410 to Drexelius et al., which employed a flattened malleable expanding-tube containing a linear explosive charge. The pressure generated from the explosive charge caused expansion of the flattened tube is capable of performing useful work such as severing an adjoining structure. This thin-walled expanding-tube technique was further developed in the expanding-tube double-fracture type joints as taught in U.S. Pat. No. 3,698,281 to Brandt et al. and optimized in U.S. Pat. No. 4,685,376 to Noel et al.. In these inventions the expanding-tube device comprises a partially flattened metal tube with a coaxial linear explosive(s) running the full length of the tube. The tube ends are sealed and fitted with booster end tip detonator devices. When the linear explosive is activated, the resulting shock and internal pressure increase causes the tube to expand, whereupon a pair of doublers or a clevis type arrangement enclosing the tube is fractured and separated along a weakened section underlying a notch or groove that extends longitudinally along the doubler joint. The tube expansion is predominately in the plane of separation; therefore, a non-thrusting separation is produced.

Typically, in thin walled expanding-tube devices, the linear explosive is encased in a support material such as silicone rubber to maximize energy transfer to the tube wall. The sealed tube assembly imparts displacement energy without releasing debris or gases from the device itself. The small displacements and high forces generated by expanding-tube devices are suited to fracturing adjoining structures as used in the Brandt '281 and Noel '376 patents, or releasing shear pin attachments found in tongue-and-groove type linear separation systems as shown in FIG. 8. Referring to FIG. 8, a typical tongue-and-groove type joint has a female member 62, and a male member 64, an expanding-tube device 65 and a shearable connector 69. The expanding-tube device comprised a partially flattened metal tube 66 in which is disposed an explosive cord 68 wrapped by an elastomeric sheath 67. This expanding-tube assembly is placed between the female member 62 and the male member 64. Connector 69 then joins the members. Detonation of the explosive cord 6S causes expansion of tube 66, which exerts forces that causes the connector 69 to fail in shear. When used in a rivet-shear tongue-and-groove arrangement, the tube expansion is in the direction of the separating joint halves, generating some usable thrust energy in addition to the high rivet-shear separation forces.

One of the advantages of such expanding-tube systems is the relatively large amount of force that they can produce. This force may be used to sever structures or to shear rivets. A disadvantage of this type of system is that the force is exerted over a relatively small stroke distance. Therefore, at most, only a small amount of thrust can be imparted to formerly connected components using expanding-tube devices.

The Carr '290 patent teaches another type of linear explosive separation system. This noncontaminating separation system utilizes a linear piston-cylinder combination with an explosive cord contained within and running the full length of the joint. The piston and cylinder, which are held together by a row of retaining rivets, form a chamber which extends the length of the joint. The linear explosive is contained within two concentric stainless steel attenuator tubes which are in turn confined within a thin walled flexible bellows. This tube-bellows assembly is contained in the chamber formed by the piston-cylinder. The concentric tubes, consisting of a smaller tube inside a larger tube, serve to control and contain the shock of detonation and control the flow of hot gases produced by detonation of the explosive into the bellows through gas metering and directing openings in the tubes. This gas flow metering and directing is necessary to prevent perforation of the bellows material by the concentrated flow of fast moving hot particles from the exploding MDC. When the linear explosive is detonated, the rapidly expanding gases pass through the vent holes in the attenuator tubes into the bellows. The action of the expanding gases in the bellows creates a force which reacts against the piston-cylinder combination within the chamber, shearing the retaining rivets and producing thrust to separate the joint, which may be coupled to fairing half-shell structures.

In the thrusting joint as described above, all products of detonation are fully contained within the bellows, resulting in a noncontaminating separation. The thrusting joint separation system described above thus performs two functions during the separation event: Shear rivets to release the piston-cylinder joint halves, and thrust to provide a separation velocity to the fairing half-shells. The energy required to shear rivets is usually calculated on a force-per-foot basis. For example, typical longitudinal joint shear structural requirements for payload fairings range, for example, from 5,000 to 20,000 pounds per foot (lbs/ft). Shear forces generated by hot gases metered into the flexible bellows are dependent upon the bellows pressure and the piston area. On a unit length (per foot) basis, the piston area is a function of the piston width; therefore, available shear force (lbs/ft)=bellows pressure (psi)×piston width (in)×12 (in/ft). However, shear force generation can be limited by several factors: MDC core loading limitations, attenuator tube confinement capability, detonation shock limitations, peak gas pressures obtainable, bellows operating pressure limits, piston width limits, or overall separation system weight limits.

While thrusting joints have the advantage of a relatively long stroke distance that is of benefit in providing thrust to push apart separated pieces, they have the disadvantage of providing relatively weak shear forces with which to cause an initial separation of connected pieces, e.g., to shear rivets or other connectors.

Applications exist for lightweight, medium to small sized fairings that have joint shear requirements in the 10,000 to 20,000 lbs/ft range, for example. Prior art thrusting joint systems are not capable of providing adequate shear forces without becoming too large and heavy for these applications.

The various types of linear separation joints heretofore known in the art have advantages along with inherent disadvantages that limit their usefulness, as shown in the following table:

TABLE 2

Prior Art Linear Separation Joint Characteristics

| Joint Type | Joint Strength | Joint Weight | Contaminating | Thrust |
|---|---|---|---|---|
| Thrusting Joint | Low | High | No | High |
| Expanding-Tube Double Fracture | High | Low | No | None |
| Expanding-Tube Rivet Shear | High | Low | No | Low |
| FLSC/MDC Severance | High | Low | Yes | None |

As can be seen, none of the existing systems provides high thrust combined with the capability of severing a high strength joint. It is desirable that such a joint be provided, preferably having a low or medium joint weight.

SUMMARY OF THE INVENTION

The present invention provides a noncontaminating thrusting separation system that provides sufficient shear forces generated by an expanding-tube to separate a high strength joint, as well as a thrusting force provided by an inflatable flexible bellows. This invention provides a separation joint which shears connecting rivets during the initial expansion of expanding-tube assembly when explosive forces are at their greatest. This is in contrast to using the flow of cooling gases to shear rivets with a bellows-piston assembly. Further, the present invention provides a lightweight, noncontaminating, structurally efficient separation joint which provides thrust energy through use of a sealed flexible bellows that inflates after the retaining connectors have been sheared. Preferred embodiments of the invention, as described herein, are intended for use in payload fairing longitudinal split-line 50 separation applications as shown in FIG. 7. The present invention may be made lighter in weight and provide more joint shear capability than the prior art, while still providing high thrust energy. In summary, the present invention meets the need for a high shear force, lightweight, thrusting joint for use on medium to small fairings.

This invention involves separating joints for use primarily in aerospace applications. There are two operational components of the preferred separating system. The first component provides a high force over a short stroke distance, using an explosively actuated expanding-tube to shear connectors such as rivets. The second component provides a longer stroke, thrusting force to impart a separating velocity to the structures connected using this joint. The second component comprises a flexible bellows surrounding the expanding-tube. The bellows is inflated by gases that exit the expanding-tube. In operation, the detonation of an explosive cord in the tube causes the tube to expand and shear rivets or other connectors. The detonation gases then exit the tube, usually through vent holes, to inflate the bellows, which pushes the separated structures apart.

The noncontaminating thrusting separation system of the present invention takes advantage of the high initial rivet shear forces generated by an expanding-tube device and combines this with the high thrust energy obtainable with a flexible bellows. The current invention provides a reliable means for separating parts with a minimum shock imparted to the surrounding structures. The non-permeable bellows material contains the gaseous products of detonation after separation of the parts which thereby protects other parts and components of the assembly from contamination by the explosive gases and debris.

The weight per foot of a joint is an important consideration in that typical fairings range from 15 to 30 feet in length with two joint assemblies running approximately this full length for a clamshell (or bisector) type configuration and three joint assemblies for a trisector configuration. Reducing the weight of a joint from 6.0 to 3.0 lbs/ft provides for a significant weight savings of 150 pounds for a 25 foot long clamshell fairing (3.0 lbs/ft×25 ft×2 joints/fairing 150 lbs/fairing). This weight savings is significant when one considers that a 6.0 foot diameter by 25 foot long composite fairing would weigh approximately 1,000 pounds.

In a preferred embodiment, the expanding-tube device comprises a partially flattened thin walled stainless steel tube housing comprising an elastomeric sheath, which may be made of silicone rubber. The sheath is preferably sized to substantially fill the flattened tube inner volume. The sheath has a central longitudinally disposed cavity which houses the mild detonating cord (MDC). The sheath protects the MDC from the severe launch vehicle environments, minimizes the propagation of the MDC explosive shock energy to the surrounding structure, and enhances the transmission of detonation energy to the tube wall, thereby maximizing the tube wall expansion forces. In addition, the flattened tube contains a row of vent holes for release of high pressure detonation gases into the nonpermeable bellows that surrounds the expanding-tube. Upon detonation of the MDC, the explosive shock and high pressure gas energy will cause the flattened steel tube to expand to a more circular cross section. This sheathed MDC/expanding-tube device is positioned within an inflatable bellows and between the riveted piston and cylinder combination in such a manner that this tube expansion will act directly upon the piston-cylinder combination, causing severance of the retaining rivets or other severable fasteners.

After the initial expansion of the metal tube shears the rivets or other fasteners, the rapidly expanding-gases will inflate the bellows, causing a reaction force against the piston-cylinder combination within the chamber, thus producing linear thrust to continue to propel the piston and cylinder portions of the joint away from one another, completing the separation and thrusting operation. The products of detonation of the MDC are contained within the flexible bellows to provide a noncontaminating separation system. The silicone rubber sheath generally fragments and does not significantly restrict the flow of gases into the bellows chamber. A thin metallic blast shield may be positioned between the vent holes and the bellows material to prevent perforation of the bellows by the concentrated flow of fast moving hot particles from the exploding MDC.

Another novel separation system that forms the basis of part of the above-described expanding tube with bellows embodiments of the invention is the attenuator tube with shield configuration (see FIG. 6A-6D). Embodiments of this system employ a tube containing an explosive and having vents that allow for the escape of the explosive gases into a bellows device. To prevent the hot gases from burning through the bellows a shield is placed between the vents and the inner surface of the bellows. This configuration may be employed with an expanding tube, as is done in the preferred embodiments of the expanding-tube/bellow system described above. Further, the attenuator tube with shield configuration may be used in bellows systems that do not contain an expanding tube. For example, it may be employed in place of (and is considered to be an improvement over) the double tube configuration of the Carr patent.

The tube with shield configuration has several advantages. First, it is much easier to manufacture than the double tube configurations employed in the prior art, for example, as described in the Carr patent. This ease of manufacture results from the fact that there is no need to thread one metal tube inside the other to make a tube with shield device, whereas this is required with double tube configurations. Further, it is necessary to maintain appropriate spacing between the vents of a separation system tube and any outside obstructions, if the gas flow into the bellows system is to occur properly. This appropriate spacing is difficult to maintain when a double tube separation system is being bent to conform to the contours of a fairing, a difficulty increased by the fact that fairing contours are becoming increasingly complex. It would be close to impossible to maintain this spacing in a situation where one wished to use double tubes in an expanding tube configuration, since the flattening of the double tube assembly would severely restrict the flow of gases between the two tubes. Therefore, it is unlikely that a double tube type device could serve as the expandable connector shearing device of the expanding-tube/bellows configurations described above.

The more preferred embodiments of the present invention comprise linear piston and cylinder configurations designed generally for the separation of stages and/or fairings on launch vehicles. However, circular cylinders and pistons, square cylinders and pistons, and other configurations of a shearably connected pistons and cylinders can be separated using the present invention.

BRIEF DESCRIPTION OF THE DRAWINGS

The various features and advantages of this invention will become apparent upon consideration of the following description taken in connection with the accompanying drawings.

FIG. 4A shows the joint before detonation of the MDC.

FIG. 4B shows the joint after detonation, when the expanding-tube has expanded and sheared the rivets.

FIG. 4C shows the joint after the bellows has partially inflated with gas from the expanded tube.

FIG. 4D shows the joint after the bellows has fully inflated and the joint halves are no longer engaged.

FIG. 8 shows a cross-sectional view of a prior art expanding-tube rivet shear joint.

DETAILED DESCRIPTION OF THE PREFERRED EMBODIMENTS

Preferred embodiments of the thrusting separation system of the present invention comprise a coupling system, shearable connectors, a connector shearing device and an inflatable bellows. The coupling systems of these preferred embodiments have male members and female members, where the female member has a receptacle and the male member has a projection which fits within the receptacle. The male and female members preferably fit together such that a chamber is formed between the sides of the receptacle and the projection. Shearable connectors, typically metal rivets, bolts or pins, pass through the projection and receptacle to connect the male and female members. The connector shearing device comprises a housing and an explosive cord. Detonation of the cord generates force sufficient to expand the housing and shear the connectors.

More preferred embodiments of the thrusting separation system of the present invention comprise a linear piston, a linear cylinder, connectors, a bellows-tube assembly comprising a tubular flexible bellows surrounding a vented expanding-tube, a linear explosive positioned in the expanding-tube, and a sheath surrounding the linear explosive. An example of such an embodiment is illustrated in FIGS. 1-5 and described below.

Figure 2A:
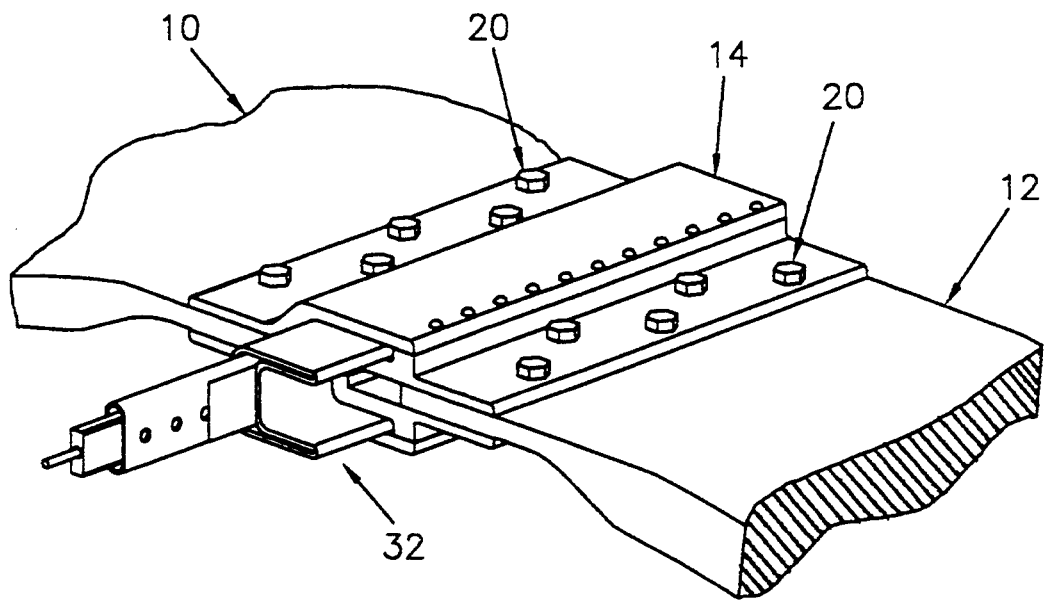
FIG. 2A shows a cut-away perspective view of a thrusting joint assembly according to this invention.
Figure 2B:
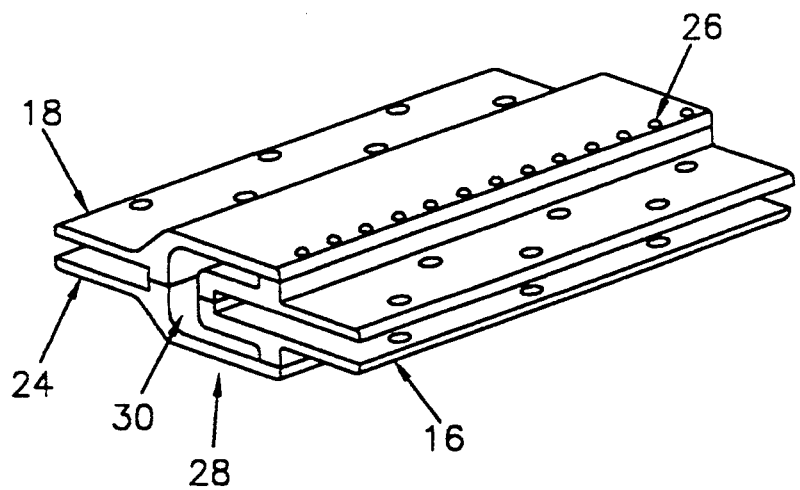
FIG. 2B shows the joint of FIG. 2A without the expanding-tube/bellows assembly in place between the male and female parts of the joint.
Figure 2C:
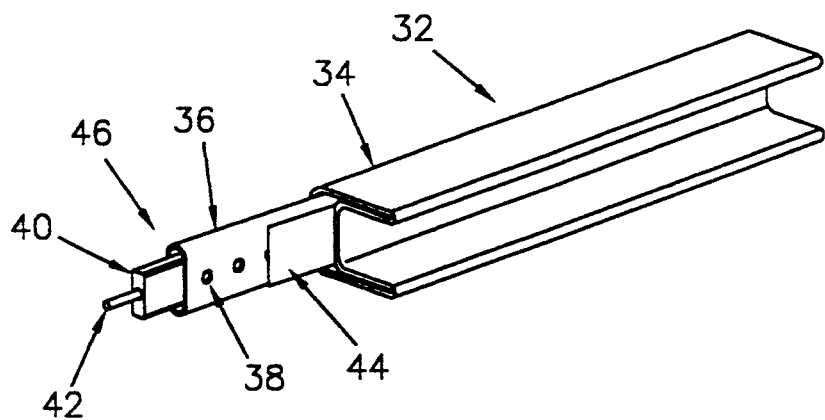
FIG. 2C shows a partially cut-away perspective view of the expanding-tube/bellows assembly removed from the other parts of the joint.

As shown in FIG. 2A, the two fairing half-shells 10, 12 are held together at their respective split-lines by riveted linear piston-cylinder arrangement 14. Referring to FIGS. 2A-2C, the linear piston 16 is fastened to half-shell 12 by means such as bolts 20. The linear cylinder 18 is fastened to the half-shell 10 with means such as bolts 20. The elongated rail segments 16, 18 may be fabricated of aluminum, magnesium, composite or other appropriate material compatible with the half-shell structure and separation system functional requirements. The rails may be generally flat or planar as illustrated, or may be of a special shape and configuration required by the payload fairing or any other structure which is to be explosively separated. The linear piston 16 is secured to the linear cylinder 18 by retaining rivets 26. When the illustrated embodiment is assembled, the piston-cylinder combination 28 forms a linear U-shaped chamber 30 (as shown in FIG. 2B) which runs the full length of the joint. This chamber houses the bellows-tube assembly 32 shown in FIG. 2C.

While metal retaining rivets 26 are used in some embodiments of the invention, those of skill in the art will readily understand that other connectors may be employed in the present invention, so long as they are constructed of a material that is capable of securing the male and female members together with the desired strength and shearable upon the exertion of a preselectable amount of force. These connectors can comprise, for example, rivets, bolts, screws, pins, etc., or the shear or tensile fracture of a continuous or partially continuous shear or tensile strip. In the presently preferred embodiments, the connectors are made of metal, but they can be made of any desired rigid, shearable material, for example, plastic, ceramic, wood, etc.

Figure 3:
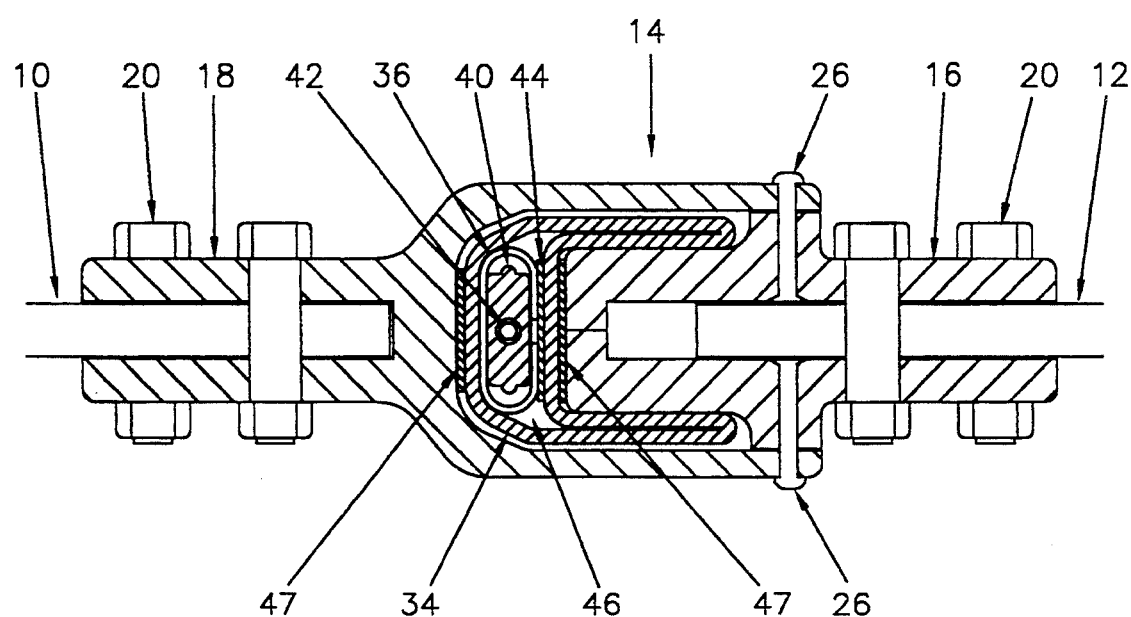
FIG. 3 shows a cross-sectional view of a separating joint according to this invention with the joint assembled, prior to detonation.

As shown in FIGS. 2C and 3, the bellows-tube assembly 32 of a preferred embodiment comprises a tubular flexible bellows 34, a flattened tube 36 with vent holes 38, a sheath of silicone rubber 40 containing the linear explosive charge or mild detonating cord (MDC) 42, and a thin metal shield 44. The flattened tube rubber sheath 40 and MDC 42 form the expanding-tube component 46 of the preferred embodiment. The tube and bellows ends may be sealed against leakage. Bellows 34 is made of a flexible, nonpermeable material. The bellows is intended to contain all of the high pressure gases and contaminants emitted from the detonation of the MDC 42.

Flattened tube 36 is selected to be of a material and thickness that allows it to expand upon detonation of the explosive core. It is the expansion of the tube which causes shearing forces to be applied to the connectors resulting in the de-coupling of the male and female rails. Various types of tube material and construction may be used in the expanding-tube assembly 46 of the present invention, and a thin walled Type 304 seamless stainless steel tube per MIL-T-8504 has been demonstrated to work well in this application. Tube 36 diameters from 0.25 to 0.75 inches with wall thicknesses from 0.016 to 0.065 inches have been demonstrated in expanding-tube devices with various MDC 42 grain loadings, however, these diameters and thicknesses are in no way limiting and it is possible to use larger or smaller tubes as a given application dictates. A presently preferred embodiment uses a 0.625 inch outside diameter tube 36 with a 0.035 inch thick wall. The shear force generation capability of the expanding-tube 46 device is determined by the amount of explosive used, for example, MDC 42 grain loading, and the tube 36 size. The tube 36 is typically of an appropriate size to be structurally adequate to contain the detonation shock and high pressure gases. The present invention has been demonstrated to work with an adequate margin of safety using a 20 grain per foot HNS MDC 42. However, tube rupture was experienced when a 0.50 inch outside diameter by 0.035 wall tube 36 was tested with the same change. Smaller tubes 42 with thinner walls can be used with lower MDC 42 grain loadings, and their shear force generation capability and residual bellows thrust will be reduced accordingly. The dimensions of the tube and amount of explosive employed can be varied according to the application.

Tube 36 is perforated with vent holes 38 such that gases from the detonation of the explosive cord 42 can flow out of the tube 36 and inflate the bellows after the tube has expanded to shear connectors 26. Vent holes 38 are sized to sequence the operational events of the invention, with expansion of the expanding-tube 36 to shear the connectors 26 occurring prior to the gas flow into the bellows 34 to generate thrust. Although it may appear that the high pressure gases from detonation would immediately vent from the tube into the bellows and reduce the tube expansion, the physical laws of gas dynamics prevent this from happening. The initial expansion of tube 36 occurs a fraction of a millisecond after detonation, whereas the gas flow into bellows 34 occurs over several milliseconds. By sizing the vent holes 38 in concert with varying the MDC 42 grain loading the sequence of connector 26 shearing followed by bellows 34 expansion can be controlled. Vent hole 38 sizing, and, therefore, gas flow, in controlled by the size and spacing, or number, of holes in the tube 36. Typical vent hole sizes range from 0.125 to 0.250 inches in diameter with spacing from 0.5 to 2.0 inches per hole, but these dimensions may vary dependent on application. In one preferred embodiment, holes with a diameter of 3/16 of an inch are placed on 1 inch centers along the tube. MDC grain loading, vent hole 38 size and spacing are typically estimated through gas flow dynamic modeling and verified by testing. The separation velocity of the fairing half-shells can be varied from a minimum velocity which would occur if there were no vent holes to approaching maximum velocity which would occur if the tube fragmented after the rivets 26 are sheared. Designing the tube 36 to fragment after the shearing of the rivets 26 would eliminate the need for vent holes 3S plus it would provide the maximum separating velocity between the half-shells.

Bellows 34 may be fabricated using a substantially impermeable flexible material which is of sufficient strength to withstand the flow of explosively generated gases and the pressure that they create. In a preferred embodiment, the bellows 34 comprises a flexible, nonpermeable material such as the inner hose of a double jacketed fire hose. Fire hose may have a double jacket configuration in which the inner hose is designed to withstand the high pressure of pumped water and the outer hose is designed to withstand abrasion from being dragged over the ground, driven over, etc. Preferred embodiments of the present invention use the inner hose portion of a fire hose assembly only. This is a lightweight hose with an outer sleeve of high strength, low stretch nylon or polyester filament yarn with a polyurethane thermoplastic inner liner. Suitable bellows material can be obtained from National Fire Hose Corporation of Compton, Calif.

In the preferred embodiments, a sheath is provided inside of tube 36 to support MDC 42. The sheath 40 may comprise silicone rubber or other suitable shock absorbing and thermal insulating material, preferably shaped to substantially fill the cavity within the flattened tube 36. Sheath 40 contains a cylindrical cavity containing MDC 42. Sheath 40 supports and holds MDC 42 in the proper position, generally centered within expanding-tube 46. The sheath also protects MDC 42 from sudden temperature variations through which the components of a launch vehicle may pass, and it protects MDC 42 from external shock to which a launch vehicle may be subjected during operation. The shock of detonation of the MDC 42 is minimized by sheath 40 such that minimum shock will be imparted to surrounding parts such as the fairing half-shells 10 and 12. The principal force causing expansion of the flattened steel tube 36 is the high pressure front generated within the tube 36 by the gaseous products of the detonation of the MDC 42. The sheath 40 enhances the transmission of this high pressure energy to the tube wall by minimizing the gas expansion volume within the tube 36 and, thereby, maximizing the pressure and, therefore, the tube expansion forces. The use of two, redundant linear explosive cords 42 within sheath 40 is within the scope of the present invention.

The linear explosive 42 used in the present invention is typically a mild detonating cord (MDC). The explosives used in the core of these systems and the present invention can be any of the wide variety of explosives conventionally used in detonating cords. Chief among these are PETN (pentaerythritol tetranitrate), RDX (cyclotrimethylenetrinitramine), and HNS (hexanitrodiphenylsulfone) and others listed in Table 1, above. The presently preferred linear explosive 42 is the commercially available HNS-II MDC. A wide range of explosive core loads are available. Core loads in the range of 10 to 20 grains per foot have been used in prototypes in the present invention.

Figure 4A:
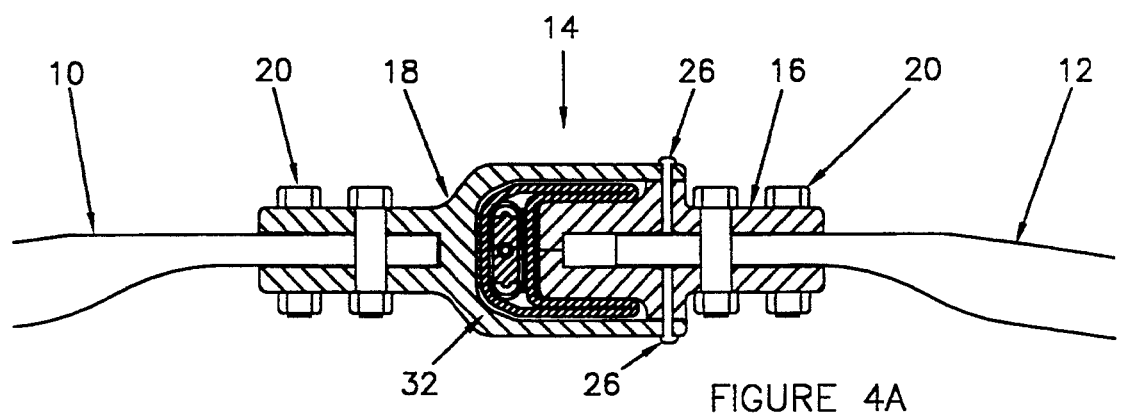
FIGS. 4A through 4D show cross-sectional views of a separating joint according to this invention at four different times before, during and after detonation of the joint.

As shown in FIGS. 3 and 4A, in a preferred embodiment tube 36 is initially in an oval or flattened configuration, and is dimensioned to nearly fill the space between linear piston 16 and the linear cylinder be at the bottom of U-shaped chamber 30. Clearance is allowed for the thicknesses of the tubular bellows 34 (surrounding flattened tube 36) and shield 44. Shield 44, which may be a thin metal strip, is included to prevent bellows burn-through by the flow of detonation gases from the vented expanding-tube 46 into the bellows 34. The remainder of the tubular bellows 34 is folded in a U-shape such that it fits within the U-shaped chamber 30 formed by the riveted piston-cylinder combination 28 of the illustrated embodiment.

Shield 44 can be of any material that will withstand the streams of hot gas exiting the vent holes and that will protect the inner surface of the bellows from the hot gas. In preferred embodiments, a thin (for example, 0.015–0.020 inch thick) stainless steel barrier may be used as the shield. Bellows puncture may also be caused by the extremely high expanding-tube forces acting through the bellows material during the first, shearing phase of the operation of this invention. Thin cushioning material 47 (as shown in FIG. 3) may be placed between the bellows and the piston and cylinder surfaces to help distribute forces generated by the expanding-tube over a larger surface area to prevent bellows puncture. Thin (0.030 inch thick), heavy cardboard material is suitable for this purpose.

Figure 4B:
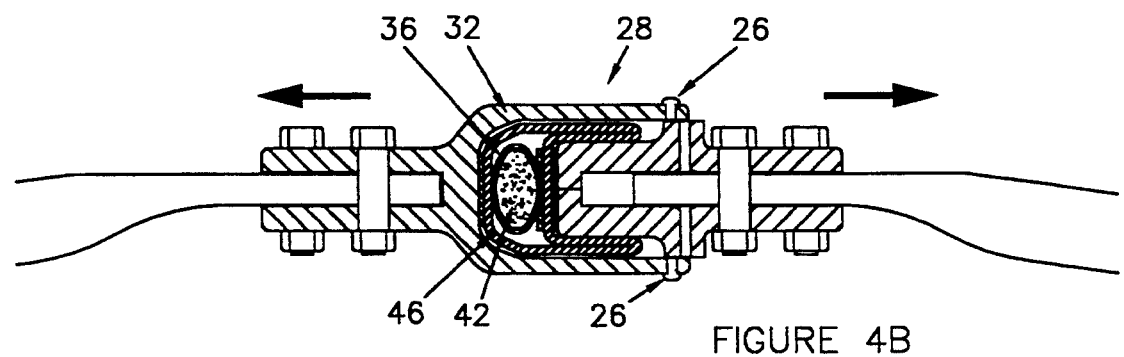

As shown in FIG. 4B, the detonation of the MDC 42 will cause the flattened tube 36 to expand to a more circular cross section. This expanding-tube device 46 is positioned within bellows-tube assembly 32 and piston-cylinder combination 28 in such a manner that this tube expansion will act directly upon piston-cylinder combination 2S causing severance of retaining rivets 26.

Figure 4C:
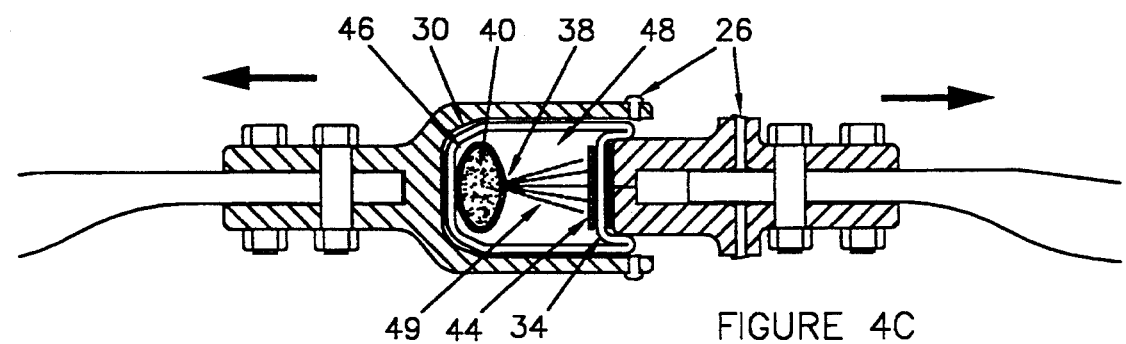

As shown in FIG. 4C, the entrapped detonation gases within the expanded tube assembly 46 flow through vent holes 38 releasing high pressure gases into flexible bellows chamber 48. A silicone rubber sheath 40 generally fragments and does not significantly restrict the flow of gases into the bellows chamber 48. A thin metallic blast shield 44 may be used between vent holes 38 and the inside wall of bellows 34 to prevent the perforation of the bellows by the concentrated flow of the fast moving hot particles from the exploding MDC 42. The flow of gases is shown by the dashed lines 49 in FIG. 4C.

Figure 4D:
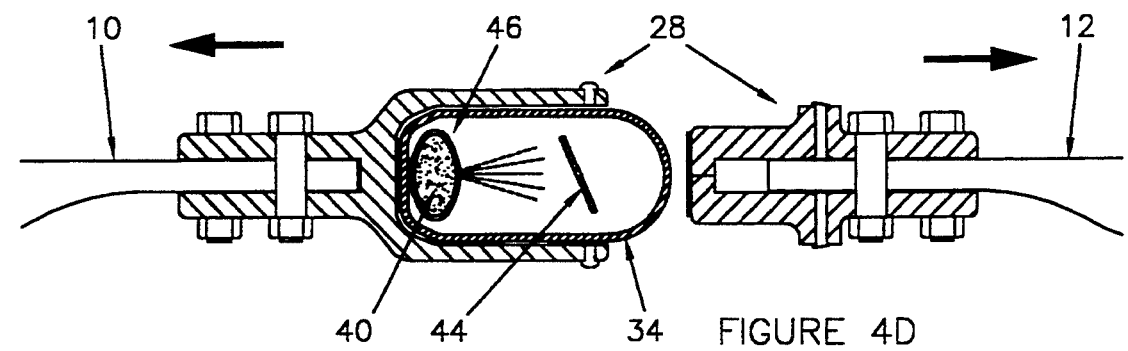
Figure 5:
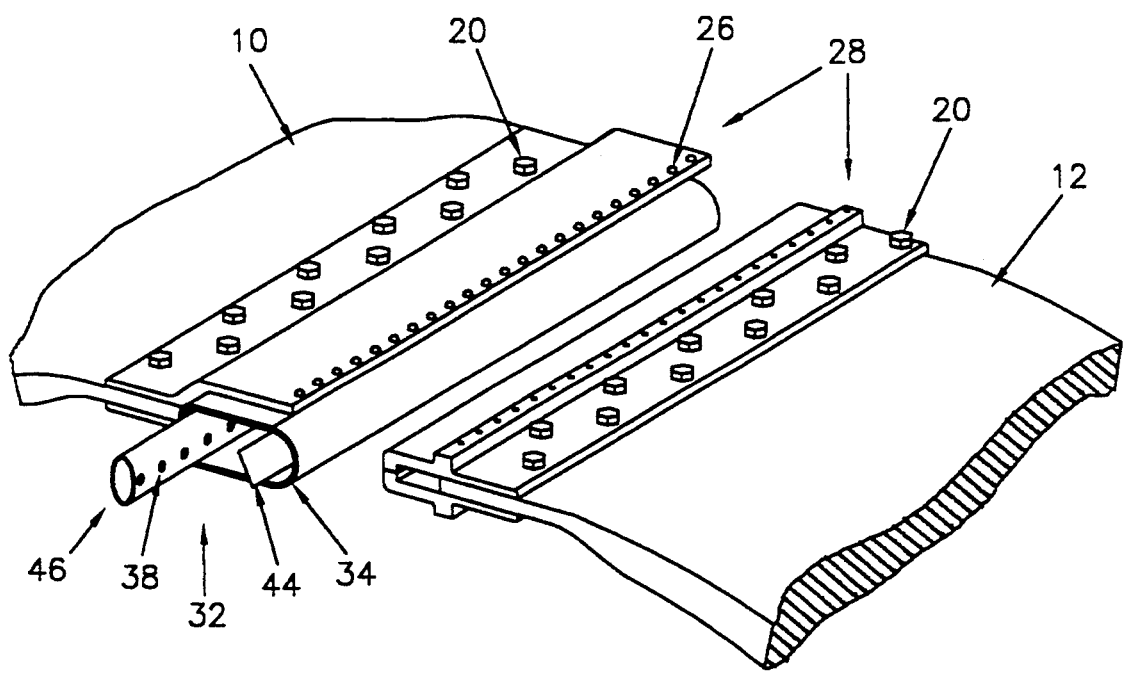
FIG. 5 shows a cut-away perspective view of a separated joint according to this invention, showing the bellows in its fully inflated condition.

As shown in FIGS. 4C and 4D, the rapidly expanding gases will inflate the bellows 34 causing a reaction force against the separated piston-cylinder combination 28 within the chamber 30 producing the linear thrust necessary to propel the fairing half-shells 10, 12 away from each other and the launch vehicle, completing the separation operation. All of the products of detonation are contained within the inflated bellows 34, thus providing a noncontaminating separation. FIG. 5 shows an isometric cut-away view of the separated joint.

Referring to FIG. 3, to construct a separating joint to this invention, the sheath 40 and linear explosive 42 (e.g. MDC) are placed within tube 36, which may be partially flattened either before or after placement of the sheathed explosive therein. The flattened tube assembly is then placed within bellows 34. The ends of the expanding-tube and the bellows tube assembly are sealed using techniques known to those of skill in the art. The expanding-tube-bellows assembly 32 is then placed within the receptacle formed in the female cylinder part of the joint. The male piston part of the joint is operatively positioned in the cylinder, enclosing the expanding-tube-bellows assembly between the male and female parts. The shearable connectors are installed to secure the male and female parts together.

Another novel thrusting system component that is related to the above detailed embodiments of the expanding tube/bellows invention is shown in FIGS. 6A–6D. This is a tube with shield assembly that can be used to expand a thrusting bellows type separation system. This assembly is novel in that, unlike prior art systems, it does not contain a double tube assembly. The double tube assembly of, for example, the Carr patent is difficult to assemble and mold to increasingly complicated fairing profiles, due to the fact that it requires that one tube be run coaxially within another with appropriate spacing and minimal contact that could block the vent holes. The tube with shield configuration shown in FIG. 6 remedies this disadvantage of the Carr device.

Preferred embodiments of the single tube with shield thrusting separation system comprise a coupling system, shearable connectors and an inflatable bellows shearing and thrusting device. The coupling systems of these preferred embodiments have male members and female members, where the female member has a receptacle and the male member has a projection which fits within the receptacle. The male and female members preferably fit together such that a chamber is formed between the sides of the receptacle and the projection. Shearable connectors, typically metal rivets, bolts or pins, or a split-line assembly, pass through the projection and receptacle to connect the male and female members. The inflatable bellows device comprises a flexible bellows with a vented tubular housing and an explosive cord. Detonation of the cord produces high pressure gases that inflate the fellows generating forces sufficient to shear the couplings and thrust the decoupled joint halves apart.

More preferred embodiments of the tube with shield system of comprise a linear piston, a linear cylinder, connectors, a bellows-tube assembly comprising a tubular flexible bellows surrounding a vented tube and a linear explosive positioned in the tube. An example of such embodiment is illustrated in FIGS. 6A-6D and described below.

Figure 1A:
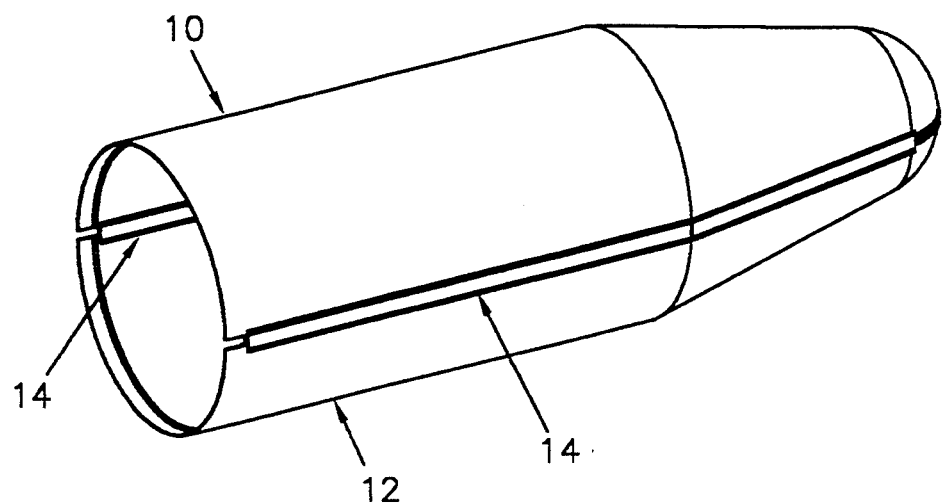
FIG. 1A shows a perspective view of a rocket payload fairing incorporating separating joints connecting the two halves of the fairing.
Figure 1B:
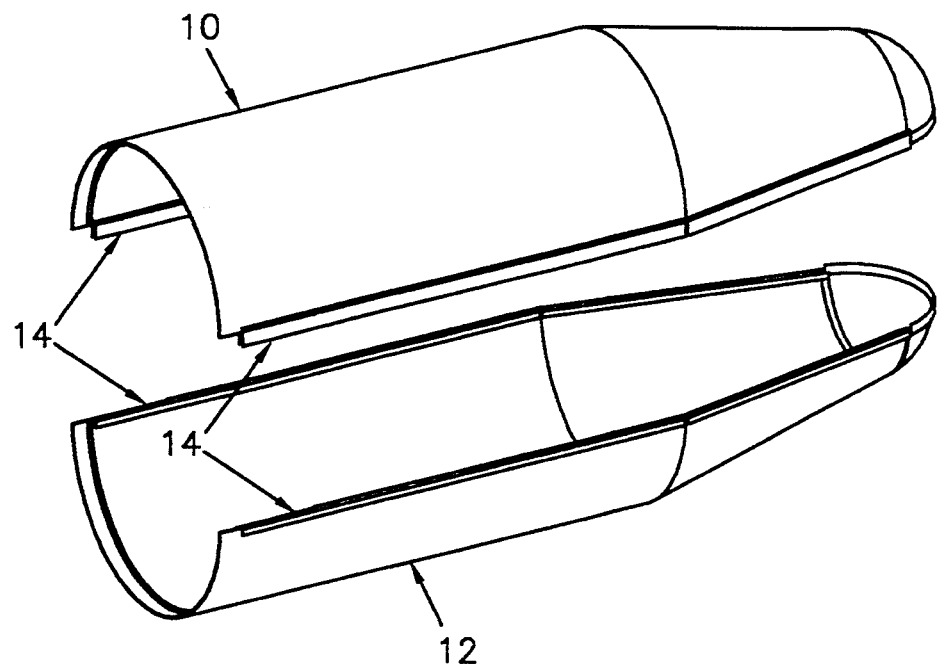
FIG. 1B shows the fairing of FIG. 1A after activation of the separating joint, the two halves of the fairing having separated.

As shown in FIG. 1A, the two fairing half-shells 10, 12 are held together at their respective split-lines by riveted linear piston-cylinder arrangement 14. Referring to FIGS. 6A-6D, the linear piston-cylinder arrangement 14 is composed of linear piston 16, linear cylinder 18, vented tube assembly 75, bellows 34, shield 44, and connectors 26. In this system, vented tube assembly 75 comprises a tube 76 having a vent 77 and an explosive cord 78 disposed in the tube. Vent 77 may be implemented as a series of holes drilled through the wall of tube 76. When the explosive cord is detonated, gases 80 flow through vent 77 into bellows cavity 48 and inflate bellows 34. The inflation of bellows 34 exerts force shearing connectors 26. Shield 44 prevents explosive gases 80 from impinging directly on and burning holes in bellows 34.

As shown in FIGS. 6A-6D, linear piston 16 is attached to half-shell 12 by means such as bolts 20. The linear cylinder 18 is attached to half-shell 10 by means such as bolts 20. Elongated rail segments 16, 18 may be fabricated of aluminum, magnesium, composite or other appropriate material compatible with the half-shell structure and separation system functional requirements. The rail segments may be generally flat or planar as illustrated, or may be of a special shape and configuration required by the payload fairing or any other structure which is to be explosively separated. Linear piston 16 is secured to linear cylinder 18 by retaining rivets, or connectors 26. When the illustrated embodiment is assembled, the piston-cylinder combination 70 forms a linear U-shaped chamber 30 which runs the full length of the joint. This chamber houses folded bellows 34 and vented tube assembly 75.

The shearable rivets or connectors 26 are usually of metal, but may be of any of the suitable materials previously described in the application.

As shown in FIGS. 6A-6D, the vented tube assembly 75 comprises tube 76 having vent 77 and an explosive cord 78 disposed in the tube. Vented tube assembly 75 is contained in the folded bellows 34. Tube 76 and bellows 34 ends may be sealed against leakage. Bellows 34 is made of a flexible, nonpermeable material. Bellows 34 is intended to contain all of the high pressure gases 80 and contaminants emitted from the detonation of the explosive cord 78.

Attenuator tube 76 is selected to be of a material, diameter and thickness that allow it to survive the detonation shock and high pressures and remain as a containment vessel for the high pressure gases 80 as they are vented into the bellows chamber 48. Various types of tube material and construction may be used in this attenuator tube 76 of the present invention, and a thin walled Type 304 seamless stainless steel tube per MIL-T-8504 has been demonstrated to work well in this application. Tube 76 is perforated with vent holes 77 such that gases 80 from the detonation of the explosive cord 78 can flow out of tube 76 through vent holes 77, which are generally sized to optimize the flow of high pressure gases 80 into inflatable bellows cavity 48. Sizing the vent holes is accomplished with hole diameter and hole spacing—usually, a certain amount of vent area per foot or unit length is required. Therefore, vent hole 77 diameter and number of holes 77 per inch can be adjusted to obtain the desired vent area. Typical hole 77 sizes range from 0.125 to 0.250 inches in diameter with hole spacing ranging from 0.50 to 2.0 holes per inch. Optimization of the flow usually means sizing the vent area such that a high percentage of the detonation gases in attenuator tube 76 flow into the bellows cavity 48 during the bellows 34 thrusting stroke (reference FIGS. 6B-6D). The time duration from detonation to end of stroke is typically on the order of 4 to 6 milliseconds. The initial peak pressure within attenuator tube assembly 75 is a function of explosive 78 and grain loading used in combination with the free volume (inside diameter) of tube 76. Initial pressures can range from a few thousand to over ten thousand psi. As mentioned previously, tube 76 must remain intact and contain these high pressures in order to properly operate as a gas flow metering device. Upon detonation, the peak pressure is obtained almost instantly and the rapidly expanding gases will vent into bellows cavity 48 causing a reaction force against piston-cylinder combination 28 sufficient to shear retaining rivets 26. Detonation to rivet shear is typically within 0.5 to 1.5 milliseconds. After rivet 26 shear the inflated bellows 34 continue to thrust on the joint halves propelling fairing half-shells 10, 12 away from each other and the launch vehicle, completing the separation operation. The gases within attenuator tube assembly 75 continue to vent into bellows cavity 48 during the stroke to maximize the thrust energy available. All products of detonation are contained within inflated bellows 34, thus providing a noncontaminating separation. FIG. 6D shows the separated joint just after the end of stroke.

Bellows 34 may be fabricated as previously described in this application.

Linear explosive 78 used in the single tube with shield system is typically a mild detonating cord (MDC). The explosives employable in the invention include those listed in Table 1, above. The presently preferred linear explosive 78 is PETN, commercially available as Primaline ® from the Ensign-Bickford Company. For example, a 5.5±0.5 grain per foot Primaline ® has been used in single, two, three and four strand configurations in the present invention.

Shield 44 can be of any material that will withstand the streams of hot gas exiting vent holes 77 and that will protect the inner surface of the bellows from the hot gas. In presently preferred embodiments, a thin (for example, 0.015 to 0.020 inch thick) stainless steel barrier may be used as the shield.

Figure 6A:
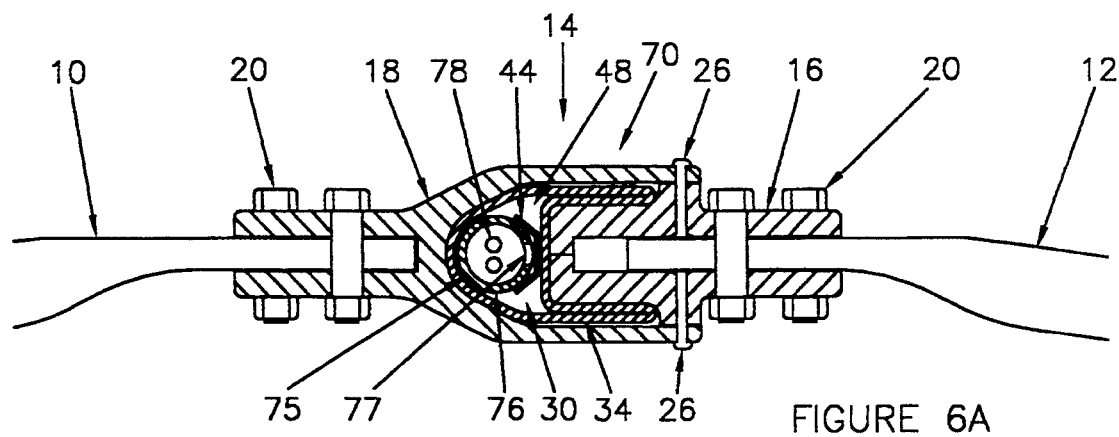
FIGS. 6A-6D show cross-sectional views of an alternative thrusting joint design with a tube and shield configuration at four different times before, during and after actuating of the thrusting joint.
Figure 6B:
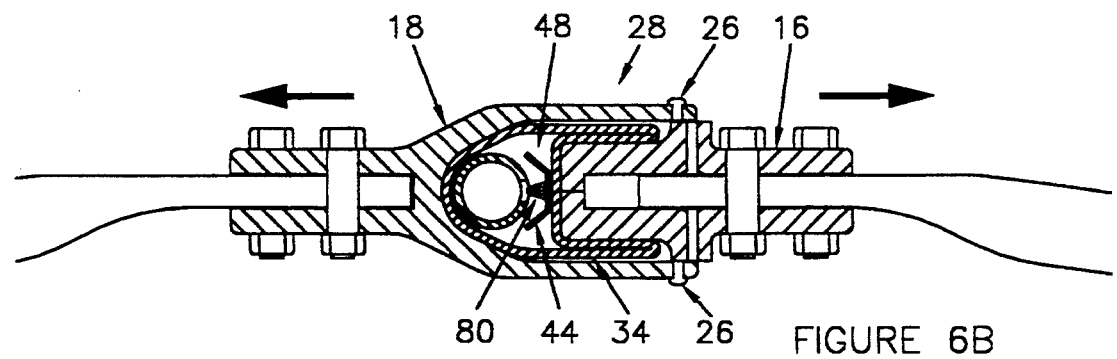
Figure 6C:
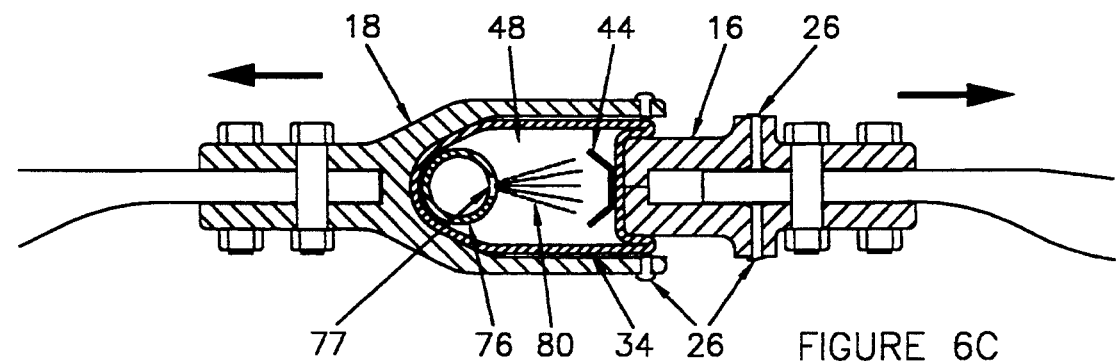
Figure 6D:
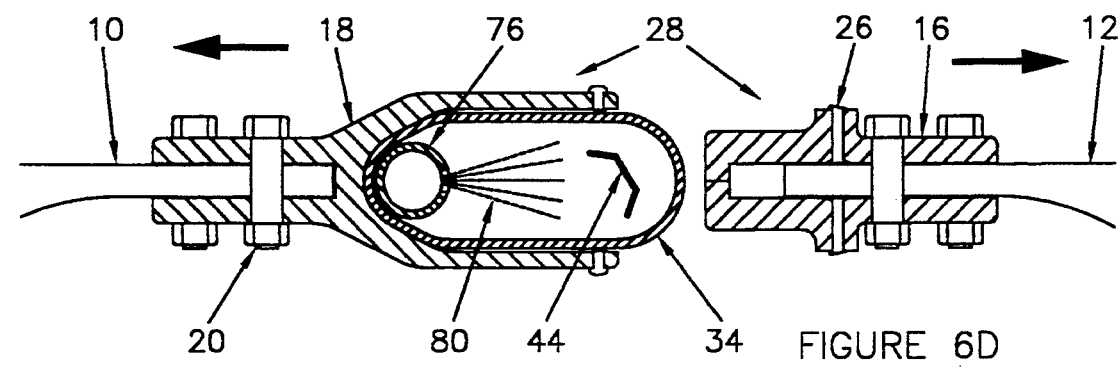
Figure 7:
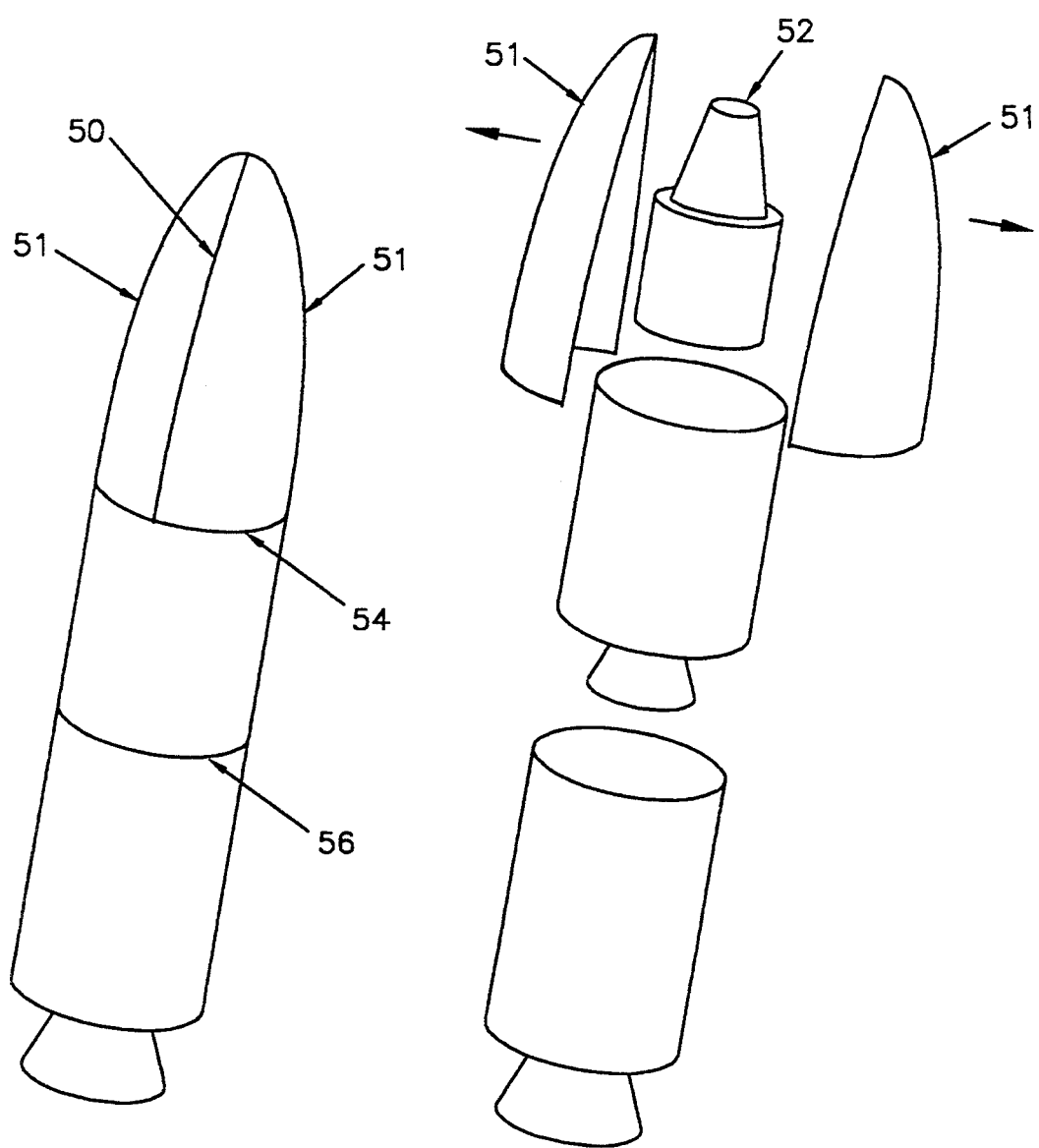
FIG. 7 shows a perspective view of a rocket indicating exemplary seams where a separating joint may be employed.

Referring to FIG. 6A, to construct a separating joint to this invention, linear explosive 78 (e.g. MDC) is placed within vented tube 76. Tube assembly 75 and bellows 34 are sealed using techniques known to those of skill in the art. This tube-bellows assembly is placed within the receptacle formed in female cylinder 18 part of the point. Male piston 16 part of the joint is operatively positioned in the cylinder, enclosing the tube-bellows assembly between the male and female parts. The shearable connectors are installed to secure male-female piston-cylinder combination 28 together.

While the content of this application describes examples and preferred embodiments of the present invention, it will be readily apparent to those of skill in the art that many modifications of the invention are possible. Modifications which do not depart from the spirit and intent of the present disclosure are contained within the scope of the present invention.

What is claimed is:

1. A thrusting separation system, comprising:
   a coupling system having a male member and a female member, said female member having a receptacle with a bottom and sides, said male member having a projection with an end and sides, whereby a chamber is formed between the end of the projection and the bottom of the receptacle when said projection operatively engages said receptacle;
   a shearable connector rigidly connecting the male member to the female member;
   a connector shearing device and an inflatable bellows disposed in said chamber, said connector shearing device comprising an expandable housing and an explosive core, said inflatable bellows encasing the connector shearing device.

2. The thrusting separation system of claim 1, wherein the housing comprises a partially flattened metal tube.

3. The thrusting separation system of claim 1, wherein the explosive core comprises mild detonating cord.

4. The thrusting separation system of claim 1, wherein the connector shearing device further comprises an elastomeric sheath that surrounds the explosive core and fills at least part of the volume between the housing and the explosive core.

5. The thrusting separation system of claim 1, wherein the housing comprises vent passages to allow gases from detonation of the explosive core to flow out of the housing and into the bellows.

6. The thrusting separation system of claim 5, further comprising a shield placed inside the bellows between the vent passages and an interior surface of the bellows.

7. A thrusting separation system, comprising:
   a linear piston;
   a linear cylinder, said linear cylinder being shaped such that insertion of the linear piston into the linear cylinder forms linear chamber;
   shearable connectors that connect the linear piston to the linear cylinder;
   a bellows-tube assembly disposed in the linear chamber, said bellows-tube assembly comprising a tubular flexible bellows surrounding a vented expanding-tube; and
   a linear explosive positioned in the expanding-tube.

8. The thrusting separation system of claim 7, further comprising a sheath that surrounds the linear explosive and substantially fills any cavity between the explosive and the expanding-tube during use.

9. The thrusting separation system of claim 7, wherein the linear explosive comprises mild detonating cord.

10. A launch vehicle, comprising:
    a thrusting separation system including; a coupling system having a male member and a female member, said female member having a receptacle with a bottom and sides, said male member having a projection with an end and sides, whereby a chamber is formed between the end of the projection and the bottom of the receptacle when said projection operatively engages said receptacle:
    a shearable connector rigidly connecting the male member to the female member;
    a connector shearing device and an inflatable bellows disposed in said chamber, said connector shearing device comprising an expandable housing and an explosive core, said inflatable bellows encasing the connector shearing device.

11. The thrusting separation system of claim 7, wherein the expanding-tube comprises a partially flattened metal tube.

12. The thrusting separation system of claim 11, wherein the expanding-tube has vent holes that penetrate the wall of the tube.

13. The thrusting separation system of claim 12, wherein a shield is disposed within the bellows between the vent holes of the expanding-tube and an interior surface of the bellows.

14. A method for connecting and subsequently separating a first component comprising a linear piston and a second component comprising a linear cylinder, the method comprising:
    providing a bellows-tube assembly comprising a tubular flexible bellows, a vented expanding-tube disposed within the bellows, and a linear explosive disposed within the expanding-tube;
    placing the bellows-tube assembly into the linear cylinder;
    inserting the linear piston into the linear cylinder, thereby enclosing the bellows-tube assembly within a cavity formed between the linear piston and the linear cylinder;
    connecting the linear piston to the linear cylinder using shearable connectors, thereby rigidly coupling the first component to the second component;
    when separation of the first component from the second component is desired, detonating said linear explosive;
    expanding the expanding-tube to displace said piston with respect to said cylinder, thereby shearing said shearable connectors to decouple the first component from the second component; and
    inflating the bellows with gasses produced by detonation of the linear explosive, thereby further displacing said piston with respect to said cylinder to impart separating thrust to the decoupled components.

15. A thrusting separation system for decoupling and separating two objects coupled to one another with shearable connectors comprising;
    a linear explosive;
    expanding tube means for decoupling said objects upon detonation of the linear explosive disposed within said expanding tube means; and
    bellows means, inflatable by gasses produced by detonation of said linear explosive, for separating and thrusting said objects away from one another after they are decoupled by said expanding tube means.

16. An apparatus for decoupling and thrusting two objects away from one another, comprising:
    a vented expanding tube disposed between two coupled objects such that expansion of said expanding tube decouples said two objects from one another;
    a linear explosive disposed within said expanding tube; and
    a flexible bellows surrounding said expanding tube, the bellows being inflatable upon detonation of the linear explosive by gasses exiting the expanding tube and operable for thrusting the decoupled objects away from one another.

17. A method for separating a first object from a second object coupled to said first object by a shearable connector, comprising:

providing between the first object and the second object a linear explosive disposed within a vented expanding tube, the vented expanding tube being enclosed within a flexible bellows;

detonating said linear explosive, thereby expanding said expanding tube to force the first object away from the second object and shear said shearable connection to decouple the first object from the second object; and inflating said flexible bellow with gasses exiting the expanding tube after detonation of the linear explosive, thereby pushing the first object away from the second object and imparting a separating thrust to the two objects.

* * * * *